3,309,296
POLYMERIZATION OF FORMALDEHYDE BY IONIZING RADIATION IN THE PRESENCE OF AN ACID ANHYDRIDE
Kenichi Fukui and Tsutomu Kagiya, Kyoto, Akira Segawa, Nishinomiya-shi, Hisao Yokota, Kobe, Masatsune Kondo, Ikeda-shi, and Seizo Nakashio, Nishinomiya-shi, Japan, assignors to Sumitomo Chemical Company, Ltd., and Sumitomo Atomic Energy Industries, Ltd., both of Higashi-ku, Osaka, Japan, both corporations of Japan
No Drawing. Filed Oct. 18, 1963, Ser. No. 317,123
Claims priority, application Japan, Feb. 13, 1963, 38/7,756
8 Claims. (Cl. 204—159.21)

This invention relates to a novel method for producing high molecular weight formaldehyde polymers. More particularly, it relates to a method for producing such polymers by exposing formaldehyde in the presence of an acid anhydride to irradiation of an ionizing radiation.

Up to the present time, there have been known several methods for producing high molecular weight formaldehyde polymers, such as a catalytic polymerization method using an amine or an organometallic compound as catalyst, and radiation-induced polymerization method by use of X-ray or other ionizing radiation.

Though these methods have many advantageous points of technique, they yet are unavoidable from many difficult problems to be solved. In the method of a catalytic polymerization, for example, there are such technical problems as difficult control of degree of polymerization, and as difficult removal of the residual catalyst from the product polymer. In the method of radiation-induced polymerization, the polymerization must be conducted at a low temperature, especially below minus 20° C. because of the instability of monomeric formaldehyde, and this is considered to be a serious difficulty from the technical point of view. High molecular weight formaldehyde polymer having properties of high degree of heat stability and mechanical strength suitable as plastics, is barely obtained under a very low reaction temperature, such as below minus 20° C., more preferably within the range of from minus 50° to minus 80° C., in case of the method of radiation-induced polymerization. For industrialization of this method, accordingly, the establishment of the extremely low temperature technology is indispensable. Further, it must be another difficulty that the G value of the polymerization reaction is very low because the reaction is carried out at an extremely low temperature.

The present inventors have found, from a series of fundamental studies on the rate of polymerization of formaldehyde and on the reactivity of formaldehyde, that high molecular weight formaldehyde polymers having superior properties suitable as plastics, as compared with the polymer obtained by the hitherto known methods, can be produced with high G value, by exposing formaldehyde monomer in the presence of an acid anhydride at a temperature as high as above minus 20° C. to an ionizing radiation.

The reaction mechanism of the present invention cannot yet be explained completely, but the fundamental principle of the present invention is based upon the behavior of formaldehyde. Namely, formaldehyde monomer is very unstable by itself and the heat polymerization reaction easily occurs even at a low temperature of below minus 20° C. to produce a low molecular weight polymer almost quantitatively. By this reason, the hitherto known methods of radiation-induced polymerization have had to be carried out at an extremely low temperature arnging from minus 50° to minus 150° C. at which the heat polymerization could not occur. Over against this, formaldehyde monomer is very stable even at such a high temperature as above minus 20° C., and the heat polymerization to produce a low molecular weight formaldehyde polymer scarcely occurs, if it contains an acid anhydride. Stabilization of formaldehyde monomer during storage prior to the start of the polymerization procedure is the subject matter of application Ser. No. 317,156 filed on even date with this application, and assigned to a common assignee. Accordingly, in the case where formaldehyde is exposed to an ionizing radiation in the presence of an acid anhydride, high molecular weight formaldehyde polymer is exclusively produced even at such a high temperature condition as from room temperature to 50° C. Moreover, the G value of the polymerization reaction is raised due to the reaction temperature higher by 50° to 100° C. than that in the known irradiation polymerization methods.

Thus, an object of the present invention is to provide a novel method for producing high molecular weight formaldehyde polymers under much more easily practicable conditions with much higher G value than those in the known methods. Another object is to provide a method for producing a high molecular weight formaldehyde polymers having exceedingly suitable properties as plastics. Still another object is to provide a method for producing high molecular weight formaldehyde polymer, which is suitably applicable to a large scale commercial process. Other objects will be apparent from the following description.

Accordingly to the present invention, formaldehyde monomer is exposed in the presence of an acid anhydride to an ionizing radiation. The acid anhydrides involve inorganic and organic ones. As a preferable example of the inorganic acid anhydride usable in the present invention, carbon dioxide may be referred to. The examples of the organic acid anhydride involved acetic anhydride, phthalic anhydride, maleic anhydride, itaconic anhydride, and the other organic acids anhydrides. They may be used singly or as a mixture thereof. The amount of the acid anhydride added to the formaldehyde varies accordingly to the conditions under which the polymerization is carried out, that is, gaseous phase or liquid phase, temperature conditions, and others. Ordinarily, the amount of from 0.01 to 1.0 mole or more per mole of formaldehyde may be used. In some cases, the acid anhydride may be used as solvent for formaldehyde monomer to be polymerized.

The reactant formaldehyde monomer may be supplied to the reaction vessel either in liquid state or in vapor state. The polymerization reaction may be carried out either in the absence or in the presence of a liquid medium. In the latter case, a polar or non-polar liquid organic medium, such as liquid aliphatic and aromatic hydrocarbons, ethers, esters, lactones and halogenated hydrocarbons, alone or as a mixture of more than one of them is usable. In case of polymerizing formaldehyde in a liquid medium, such as heptane, which hardly dissolves reactant formaldehyde, the polymerization system becomes heterogeneous, and this brings about advantages in capability of controlling the rate of polymerization and the degree of polymerization of the polymer. In this case, the liquid medium effectively serve for diffusion of the polymerization heat and it is desirable to minimize the diameter of the formaldehyde particles as far as possible. Consequently, homogeneous high molecular weight formaldehyde polymer can be produced without decrease of rate of polymerization, under finely dispersed or emulsified condition of formaldehyde by adding any of cationic, anionic, nonionic and ampholytic surface active agents in below several percent by weight based upon the liquid medium.

In another case, reactant formaldehyde monomer may be mixed with from 0 to 10% by weight of acetaldehyde, acrolein or other lower aldehyde for the polymerization, thereby to produce a copolymer of formaldehyde with a lower aldehyde.

According to the present invention X-ray, $\alpha$-ray, $\beta$-ray, $\gamma$-ray, neutron and all of the other ionizing radiations can be employed, and it is also an advantageous feature that the extremely small amount of radiation dose is sufficient to carry out the present invention.

The reaction temperature at which the formaldehyde is exposed to these ionizing radiations may be in a broad range of from plus 100° to minus 100° C., but a more moderate temperature condition of from plus 50° to minus 20° C. is preferred.

The reaction pressure may vary within a broad range, according to the reaction conditions. For example, at a lower temperature than minus 20° C., the polymerization reaction may be carried out under a reduced pressure, while at a temperature higher than minus 20° C., the reaction may be carried out under a pressure as high as above several atmospheric pressures. In case where the acid anhydride employed is of gaseous state under normal condition, the reaction pressure may be increased to as high as several tens atmospheric pressure.

The high molecular weight formaldehyde polymer obtained according to the present invention is linear high polymer, contains substantially no low molecular weight polymer, and possesses the superior thermal stability and mechanical properties, suitable as plastics.

The method of conducting the present invention is further explained concretely with reference to the following examples, which, however, are set forth only by way of illustration and not by way of limitation.

*Example 1*

Five grams of monomeric formaldehyde gas, generated by pyrolysis of $\alpha$-polyoxymethylene at 200° C., followed by purification, and 3 grams of carbon dioxide were charged into a stainless steel autoclave having 50 cc. volume, and the reaction mixture was exposed to gamma-ray from cobalt 60 at 0° C. for 30 minutes at the dose rate of 100 roentgens per hour. Thus the obtained white high molecular weight polymer of formaldehyde weighed 4.5 g., which had an inherent viscosity at 60° C. (0.5 wt. percent polymer solution in p-chlorophenol) of 1.55.

*Example 2*

An equi-volume gas mixture of formaldehyde prepared as in Example 1 with carbon dioxide was introduced into a flask which contained 100 cc. of equi-volume solvent mixture of toluene with heptane, and the content of the flask was exposed to gamma-ray as described in Example 1 for 15 minutes at the dose rate of 50 roentgens per hour while being stirred. The weight of the polymer product was 2.0 g. which has an inherent viscosity of 1.0. Using X-ray instead of gamma-ray in this example, a high molecular weight formaldehyde polymer having the same properties as above was obtained.

*Example 3*

Fifteen ml. of a toluene solution containing 10% by weight of maleic anhydride purified by vacuum distillation was charged into a glass reaction vessel provided with a stirrer, so carefully as not to contact with air, and was cooled to minus 78° C. and the gas in the vessel was evacuated. Then, 13.7 g. of formaldehyde, obtained as described in Example 1, was charged into the vessel by condensation, and the mixture was exposed to gamma-ray, while being stirred at 0° C., for 30 minutes at the dose rate of 2,000 roentgens per hour. The weight of the obtained polymer product was 1.3 g. which had an inherent viscosity of 1.60.

*Example 4*

A solution of formaldehyde in toluene containing 6.7% by weight of itaconic anhydride purified by vacuum distillation was polymerized according to the same method as in Example 3. The weight of the polymer product was 5.1 g., the inherent viscosity being 3.9, and the primary decomposition rate constant at 222° C. was 2.4% per minute.

*Example 5*

To an autoclave having 2 liter-volume and provided with a stirrer, 1 liter of purified heptane was charged, and the gas in the autoclave was evacuated under cooling. Then, 200 g. of formaldehyde obtained as described in Example 1, along with 30 g. of carbon dioxide, was charged into the autoclave by condensation. After sealing, the mixture was exposed to gamma-ray for 1 hour at the dose rate of $1 \times 10^3$ roentgens per hour, while being stirred at a speed of as high as 800 r.p.m. and kept at 0° C.

After irradiation, the mixture was diluted with cold ethyl ether and the solid polymer product was separated and washed with cold ethyl ether. The weight of the polymer product was 143 g., the inherent viscosity being 1.6, and the primary decomposition rate constant at 222° C. was 2.2% per minute.

*Example 6*

The same irradiation experiment as in Example 5 was repeated, except that 1 liter of heptane containing 10 cc. of sorbitan sesqui-oleate was used as a surface active agent. In this experiment, the adhesion of the polymer product to the wall in the vessel was prevented.

The weight of the polymer product was 151 g., the inherent viscosity being 2.6, and the primary decomposition rate constant at 222° C. was 4.7% per minute.

*Example 7*

One liter of purified toluene was charged into an autoclave having 2 liter-volume, and 300 g. of formaldehyde and 35 g. of carbon dioxide were charged as described in Example 5. After sealing, the mixture was exposed to gamma-ray for 1 hour at the dose rate of $1 \times 10^3$ roentgens per hour, while being stirred at a speed of 500 r.p.m., and kept at 20° C. The weight of the polymer product was 225 g. and the inherent viscosity being 2.3, and the primary decomposition rate constant at 222° C. was 3.6% per minute.

What we claim is:

1. A method for producing a high molecular weight formaldehyde polymer, which comprises initially mixing formaldehyde monomer and a monomer stabilizing amount of at least 0.01 mol of an acid anhydride per mol of formaldehyde, polymerizing the formaldehyde monomer in the mixture by ionizing radiation to produce high molecular weight polyoxymethylene polymer, and substantially completely separating the thus formed polyoxymethylene polymer from the initially present acid anhydride.

2. A method according to claim 1, wherein said acid anhydride is carbon dioxide.

3. A method according to claim 1, wherein said acid anhydride is selected from the group consisting of carbon dioxide, acetic anhydride, phthalic anhydride, maleic anhydride and itaconic anhydride.

4. A method according to claim 1, wherein the irradiation of ionizing radiation is effected at a temperature of from plus 100° to minus 100° C.

5. A method according to claim 1, wherein said ionizing radiation is selected from the group consisting of X-ray, $\alpha$-ray, $\beta$-ray, $\gamma$-ray and neutron.

6. A method according to claim 1, wherein the irradiation of ionizing radiation is effected in the presence of at least one of the liquid media selected from the group consisting of aliphatic hydrocarbons, aromatic hydrocarbons, ethers, esters, lactones, and halogenated hydrocarbons.

7. A method according to claim 1, wherein the formaldehyde to be exposed to an ionizing radiation is dispersed in an inert liquid medium which is non-solvent to the formaldehyde.

8. A method according to claim 7, wherein the inert liquid medium is heptane.

References Cited by the Examiner

UNITED STATES PATENTS

| | | | |
|---|---|---|---|
| 2,768,994 | 10/1956 | MacDonald | 260—67 |
| 3,030,338 | 4/1962 | Aries | 260—606 |
| 3,107,208 | 10/1963 | Chachaty | 204—154 |
| 3,135,718 | 6/1964 | Wagner | 260—67 |

FOREIGN PATENTS

| | | |
|---|---|---|
| 928,605 | 6/1963 | Great Britain. |
| 1,267,823 | 6/1961 | France. |

OTHER REFERENCES

Okamura et al.: Gamma Ray Induced Polymerization of Formaldehyde Isotopes & Radiation, vol. 3, No. 3, 1960, pp. 242–243.

Montecatini: Heat Stable Polyoxymethylenes, Chem. Abstracts, 59, p. 7724g.

SAMUEL H. BLECH, *Primary Examiner.*

MURRAY TILLMAN, *Examiner.*

R. B. TURER, N. F. OBLON, *Assistant Examiners.*